(12) United States Patent
Chen et al.

(10) Patent No.: US 8,411,669 B2
(45) Date of Patent: Apr. 2, 2013

(54) DISTRIBUTED TRANSCODING ON IP PHONES WITH IDLE DSP CHANNELS

(75) Inventors: Henry Chen, Plano, TX (US); Robert David Corley, Plano, TX (US); Paul S. Hahn, Prosper, TX (US); Tom Desjardins, Lucas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1036 days.

(21) Appl. No.: 12/105,765

(22) Filed: Apr. 18, 2008

(65) Prior Publication Data

US 2009/0262725 A1  Oct. 22, 2009

(51) Int. Cl.
*H04L 12/66* (2006.01)
(52) U.S. Cl. ..................................... 370/352
(58) Field of Classification Search .............. None
See application file for complete search history.

(56) References Cited

U.S. PATENT DOCUMENTS

| | | | |
|---|---|---|---|
| 6,320,867 B1 * | 11/2001 | Bellenger et al. | 370/420 |
| 7,223,600 B2 * | 5/2007 | Berg et al. | 435/455 |
| 7,599,355 B2 * | 10/2009 | Sunstrum | 370/352 |
| 2005/0129061 A1 * | 6/2005 | Sligo et al. | 370/468 |
| 2006/0120350 A1 * | 6/2006 | Olds et al. | 370/352 |
| 2008/0192760 A1 * | 8/2008 | Baeder et al. | 370/401 |
| 2009/0238194 A1 * | 9/2009 | Basart et al. | 370/401 |
| 2009/0290695 A1 * | 11/2009 | Schulzrinne et al. | 379/93.02 |
| 2012/0033661 A1 * | 2/2012 | Knappe | 370/352 |

* cited by examiner

*Primary Examiner* — Gregory Sefcheck
*Assistant Examiner* — Suk Jin Kang
(74) *Attorney, Agent, or Firm* — Patent Capital Group

(57) ABSTRACT

Idle DSP channels of an IP phone can be used to respond to a request to transcode a codec of an incoming call in a distributed IP phone system but only if sufficient idle channels remain available to the phone to handle basic call functions and a possible non-basic call feature (such as conferencing) of the phone.

20 Claims, 1 Drawing Sheet

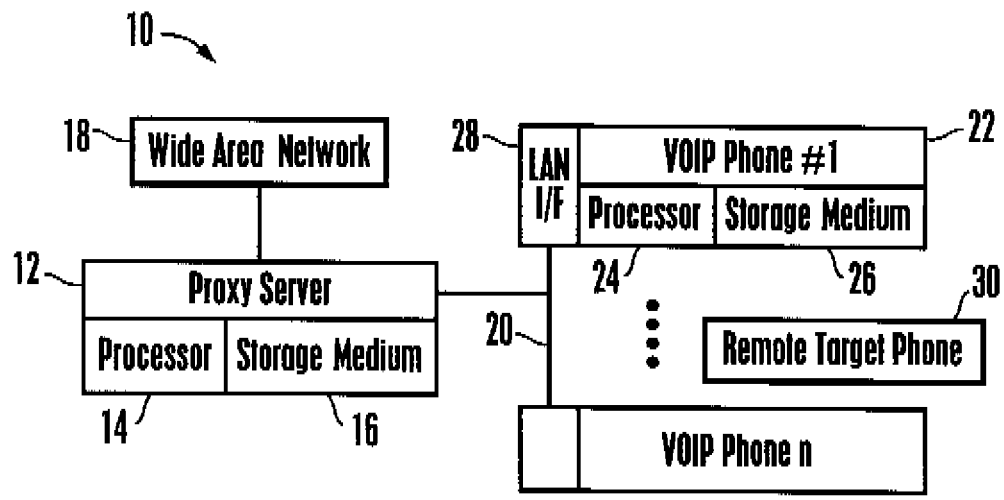
Figure 1
Figure 2
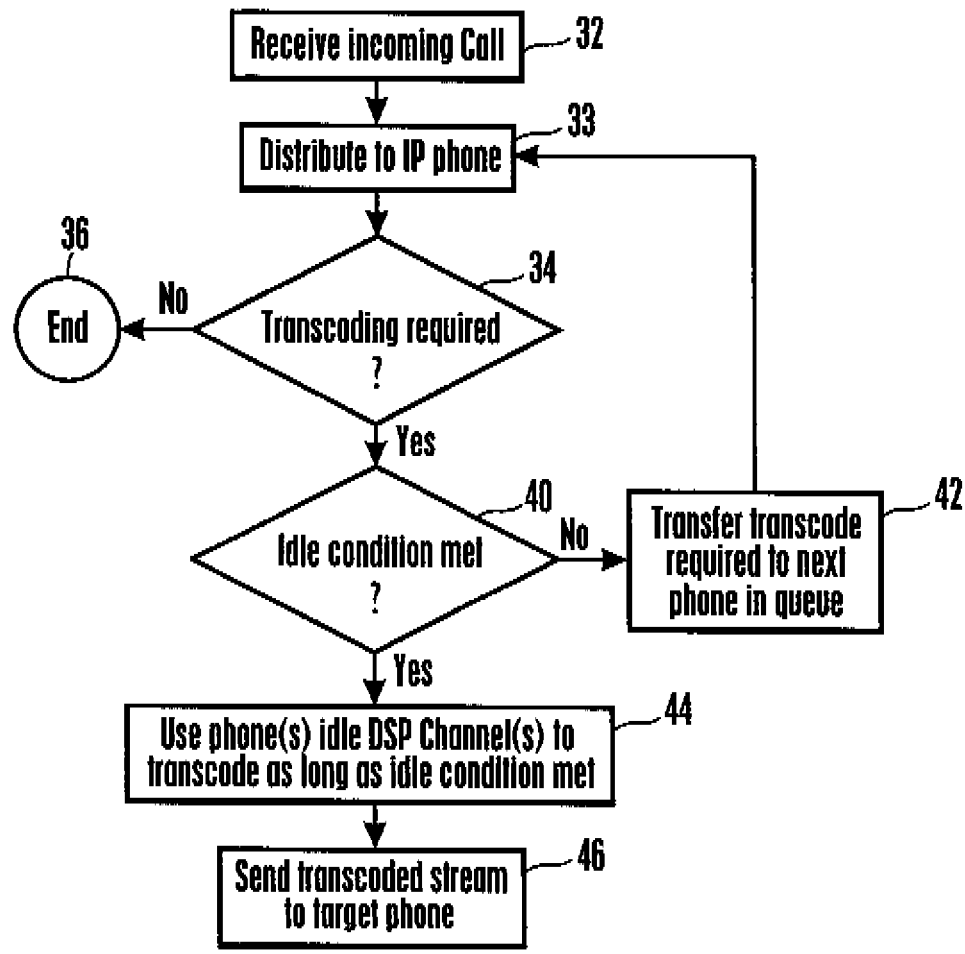

DISTRIBUTED TRANSCODING ON IP PHONES WITH IDLE DSP CHANNELS

FIELD OF THE INVENTION

The application relates generally to distributed transcoding on IP phones having idle DSP channels.

BACKGROUND OF THE INVENTION

An open standards-based Internet protocol (IP) network, such as the World Wide Web, the Internet, or a corporate intranet, can provide a telephony system typically referred to as "Voice Over IP" (VOIP) that may provide more complex telephony-type services involving call control for multiple simultaneous call sessions such as conference bridging, etc. In such systems, codec transcoding is often required to transcode the IP voice packets from a codec of a calling phone system as appropriate for a called phone's configuration. As an example, an incoming call compressed in a G.729 stream format may require transcoding to (an uncompressed) G.711 format. Such transcoding typically is performed by transcoder servers that are dedicated resources managed in the network.

BRIEF DESCRIPTION OF THE DRAWINGS

The details of non-limiting embodiments, both as to its structure and operation, can best be understood in reference to the accompanying drawings, in which like reference numerals refer to like parts, and in which:

FIG. 1 is a block diagram of an example system; and
FIG. 2 is a flow chart of non-limiting logic that may be used.

DESCRIPTION OF EXAMPLE EMBODIMENTS

Overview

As critically recognized herein, transcoding may be effected by digital signal processors (DSP) in IP phones that have channels which are temporarily idle to augment or even replace dedicated transcoder servers in an IP telephony network. As further recognized herein, however, using a DSP of an IP phone for transcoding purposes ideally should not hinder other expected uses of the phone.

Accordingly, in one embodiment an apparatus executes a machine-implemented method that includes receiving, at an Internet Protocol (IP) phone system having at least first and second IP phones, an incoming call signal characterized by a first codec. The first IP phone has a processor defining plural channels. If and only if the processor satisfies an idle condition, at least one channel of the processor is used to serve as the transcoder for the incoming call IP voice packets.

The idle condition can be, e.g., that at least two channels are not in use, such that if one unused channel is used to transcode, at least one other channel remains available to process an incoming call. The idle condition can be, e.g., that at least two channels are not in use, such that if one unused channel is used to transcode, one and only one other channel remains available to process an incoming call. Yet again, if N=the total number of channels available to the processor, M=the maximum number of channels being required by the processor for a call function in a feature set, and K=the number of channels the processor must use to process basic calls for a phone with multiple lines wherein each line can serve multiple calls, the idle condition can be that N−M>K.

If the idle condition is not satisfied, then a transcoding request can be redirected from the first IP phone to a second IP phone. If the incoming call voice packets to be transcoded are for the second IP phone, and if the idle condition is satisfied at the first IP phone and the first IP phone is used to transcode the signal to render a transcoded signal, the transcoded signal can be sent to the second IP phone.

In another embodiment, an apparatus includes means for determining, in response to a transcode request, whether a digital signal processor (DSP) of a phone has available idle channels. The apparatus further includes means for, if idle channels are available, transcoding a codes using at least one of the available idle channels but only if execution of a pre-defined prospective future function is not foreclosed thereby.

In another embodiment, a method includes receiving a request to transcode an incoming call, and transcoding the incoming call using a phone if and only if idle resources remain available to the phone to process an incoming call to the phone should one arrive during transcoding.

DESCRIPTION OF EXAMPLE INVENTIONS

Referring initially to FIG. 1, a system is shown, generally designated 10, which can include one or more proxy servers 12 (only one proxy shown) with an associated processor 14 and tangible electronic storage medium 16. The proxy 12 can communicate with a wide area network (WAN) 18. The WAN 18 may be the Internet and/or the public switched telephone network (PSTN).

The proxy 12 can also communicate with a local area network (LAN) 20 which establishes a distributed call system having plural voice over internet protocol (VOIP) telephones 22. Each VOIP telephone 22 can have a respective telephone processor 24, typically a digital signal processor (DSP) with plural respective DSP channels, and a tangible electronic storage medium 26, and each VOIP telephone 22 can communicate with the LAN 20 using a LAN interface 28. Furthermore, each VOIP telephone 22 can have more than one IP phone line, and each IP phone line can have more than one concurrent call either active or in a holding state. Therefore, each VOIP phone can have more than one concurrent call at a time. One or more remote target telephones 30 may receive calls relayed from a VOIP telephone 22, although the target telephone 30 itself is not part of the LAN 20.

The logic shown in the figures and described further below without limitation may be executed by any one of or combination of the processors discussed above. Typically, each processor can access logic stored on its associated tangible electronic storage medium such as disk storage, solid state storage, or other type of electronic storage.

Now referring to FIG. 2, as understood herein the system 10 may employ a general busy forward redirect feature which redirects a busy call to a new forward busy target, and this general busy forward redirect feature has the capability to detect the condition of the forward loop. For purposes of disclosure below, assume that N is an integer representing the total number of DSP channels of the processor 24, M is an integer representing the maximum number of DSP channels required by a non-basic call feature being currently executed or in the future to be executed by the processor 24, e.g., a phone local three-way conference that requires two DSP channels, and K is an integer representing the maximum number of DSP channels required by future basic call executions which might be required of the processor 24 for multiple VOIP lines per VOIP telephone and multiple calls per line. In one embodiment, K=1, meaning only one DSP channel is required for basic voice phone calls (no conference), no matter how many calls are currently being executed by the processor 24, since a user can only talk to one party on a call at any given time (VOIP streams on "hold" do not consume DSP channels).

With the above in mind, in an overview of one non-limiting implementation, the resource manager function of the processor 24 maintains at least three (M=2, K=1) channels available, and more specifically maintains one channel available for prospective future basic calls and two channels open for a conference call feature when allocating DSP channels for codec transcoding as described in greater detail below. Thus, if the allocation of a DSP channel for transcoding would consume the DSP channel reserved for responding to a future prospective basic call and current or prospective future conference call, the processor 24 sends a busy response to a transcode request to, e.g., redirect the codec transcode request to the next phone in the queue.

With reference to FIG. 2 for greater detail as illustrated by one non-limiting embodiment, at block 32 an incoming call is received at the proxy server 12 for one of the IP phones 22. The call is distributed at block 33 to one of the IP phones in the system, typically by accessing a list or queue of phones.

Proceeding to decision diamond 34 it is determined by, e.g., the server processor 14 or by the processor of the IP phone to which the call was routed whether codec transcoding is required for the call. This determination may be made by comparing the codec associated with the stream of the incoming call with the capabilities of the called phone. If no transcoding is required, the present logic ends at state 36 and the call is processed without transcoding.

On the other hand, if transcoding is required the logic moves to decision diamond 40, wherein it is determined whether the phone can host a transcoder by determining whether an idle condition is met by the IP phone to which the transcode request has been sent. The determination at decision diamond 40 may be made by the phone 22 of which the request was made or the phone may simply respond to the transcode request by indicating to the proxy server 12 how many available DSP channels the phone 22 has idle, with the proxy server 12 then making the determination at decision diamond 40 in accordance with principles herein.

In one embodiment, the idle condition tested for at decision diamond 40 is whether N−M>K. If the inequality is true, the test result at decision diamond 40 is positive; otherwise, it is negative. Another way of stating the test is that to satisfy the idle condition, the number of idle DSP channels of the processor 24 must be greater than M+K. For example, for a phone with N=3, M=2 for a local three-way conference, and K=1, if a conference is actively being executed by the processor 24 when the test is conducted at decision diamond 40, the resource manager function of the processor 24 will reject any codec transcoder request since the number of idle channels is equal to (and hence is not greater than) the maximum number of DSP channels required by future prospective basic calls.

If the test at decision diamond 40 is negative, the logic proceeds to block 42 to transfer the received call to the next phone in the queue at block 33. This may be effected by generating a busy redirect to the next phone in the queue, in effect hunting for a sufficiently idle phone to execute the transcode request, looping back to decision diamond 40 at the next phone to test the next phone for the idle condition.

In contrast, when the phone under test satisfies the idle condition, the logic proceeds to block 44 to use the available (N-M-K) idle channels of the phone's processor 24 (idle DSP channels when the processor is a DSP) to transcode the call, in some embodiments as long as the idle condition remains satisfied. In some implementations, if the idle condition ceases to be satisfied the transcode function can be moved to another phone in accordance with principles above. At block 46 the processor 24 sends the transcoded stream to the called (target) phone, unless the phone 22 with which the trancoding processor is associated is the target phone, in which case the processor 24 itself uses the transcoded stream.

Accordingly, when the DSP of an IP phone has limited channels and the phone is required to support multiple calls at a given time with, e.g., a rich PBX feature set, any idle DSP channels meeting the idle condition nonetheless can be used for transcoder service without consuming idle channels needed for a predefined basic function. Present principles thus provide a scalable, robust, and low cost distributed codec transcoder service that can be used by any VOIP PBX/Key product without requiring a resource that must be perpetually dedicated to transcoding while avoiding interrupting or blocking phone service for any one phone user.

In some implementations, the above-described transcode requests and redirects can be embedded in session initiation protocol (SIP) call setup messages and call forward messages without requiring extra distributed resource discovery processes and central resource management.

While the particular DISTRIBUTED TRANSCODING ON IP PHONES WITH IDLE DSP CHANNELS is herein shown and described in detail, it is to be understood that the subject matter which is encompassed by the present invention is limited only by the claims.

What is claimed is:

1. An apparatus executing a machine-implemented method comprising:
    receiving, at an Internet Protocol (IP) phone system having at least first and second IP phones, incoming call voice packets requiring transcoding, the first IP phone having a processor defining plural channels;
    distributing the incoming call voice packets to the first IP phone if and only if the processor satisfies an idle condition; and
    using at least one channel of the processor to transcode the incoming call voice packets;
    wherein if the processor does not satisfy the idle condition, the incoming call voice packets are redirected from the first IP phone to a second IP phone.

2. The apparatus of claim 1, wherein the idle condition is that at least two channels are not in use, such that if one unused channel is used to transcode, at least one other channel remains available to process an incoming call.

3. The apparatus of claim 1, wherein the idle condition is that at least two channels are not in use, such that if one unused channel is used to transcode, one and only one other channel remains available to process an incoming call.

4. The apparatus of claim 1, wherein the incoming call voice packets to be transcoded are for the second IP phone, and if the idle condition is satisfied at the first IP phone and the first IP phone is used to transcode the voice packets to render a transcoded signal, the transcoded signal is sent to the second IP phone.

5. The apparatus of claim 1, wherein N=the total number of channels available to the processor, M=the number of channels required by the processor to execute a predetermined phone feature, and K=the number of channels the processor must use to process basic calls on the IP phone, and the idle condition is that N−M>K.

6. An apparatus comprising:
    means for determining whether a digital signal processor (DSP) of a phone satisfies an idle condition; and means for distributing an incoming call requiring transcoding to the DSP of the phone if the idle condition is satisfied; and means for transcoding the incoming call using an idle channels of the DSP if the idle condition is satisfied; and means for redirecting the incoming call to a second phone if the idle condition is not satisfied.

7. The apparatus of claim 6, wherein the idle condition is that at least two channels are not in use, such that if one unused channel is used to transcode, at least one other channel remains available to process an incoming call.

8. The apparatus of claim 6, wherein the idle condition is that at least two channels are not in use, such that if one unused channel is used to transcode, one and only one other channel remains available to process an incoming call.

9. The apparatus of claim 6, further comprising means for sending a transcoded stream to another phone.

10. The apparatus of claim 6, wherein N=the total number of channels available to the processor, M=the number of channels being required by the processor to execute a non-basic call feature, and K=the number of channels the processor must use to process a basic call, and the idle condition is that N−M>K.

11. A method comprising:
receiving an incoming call requiring transcoding;
distributing the incoming call to a phone if and only if idle resources remain available to the phone to transcode the incoming call;
transcoding the incoming call using the phone; and
distributing the incoming call to a second phone if no idle resources remain available to the phone to transcode the incoming call.

12. The method of claim 11, wherein the incoming call is transcoded if at least two channels are not in use, such that if one unused channel is used to transcode, at least one other channel remains available to process an incoming call.

13. The method of claim 11, wherein the incoming call is transcoded if at least two channels are not in use, such that if one unused channel is used to transcode, one and only one other channel remains available to process an incoming call.

14. The method of claim 11, wherein if the incoming call to be transcoded is for a second phone, the transcoded signal is sent to the second phone.

15. The method of claim 11, wherein N=the total number of channels available to a DSP of the phone, M=the number of channels being required by a feature, and K=the number of channels the DSP must use to process basic calls on the phone, and the incoming call is transcoded only if N−M>K.

16. An apparatus executing logic comprising:
receiving an incoming call;
distributing the incoming call to a selected phone for transcoding the incoming call based on an idle condition of the selected phone;
transcoding the incoming call with a processor of the selected phone; and
distributing the incoming call to a second phone for transcoding the incoming call based on a non-idle condition of the selected phone.

17. The apparatus of claim 16, wherein the idle condition is that at least two channels of the processor are not in use, such that if one unused channel is used to transcode, at least one other channel remains available to process an incoming call.

18. The apparatus of claim 16, wherein the idle condition is that at least two channels of the processor are not in use, such that if one unused channel is used to transcode, one and only one other channel remains available to process an incoming call.

19. The apparatus of claim 16, further comprising sending the transcoded incoming call to a target phone.

20. The apparatus of claim 16, wherein N=the total number of channels available to the processor, M=the number of channels required by the processor to execute a predetermined phone feature, and K=the number of channels the processor must use to process basic calls on the IP phone, and the idle condition is that N−M>K.

* * * * *